United States Patent
Ohishi et al.

(10) Patent No.: US 6,334,024 B1
(45) Date of Patent: *Dec. 25, 2001

(54) HELICAL SCAN DATA RECORDING APPARATUS AND A HELICAL SCAN DATA REPRODUCING APPARATUS

(75) Inventors: Takeo Ohishi; Mitsuo Harumatsu, both of Yokohama; Seiji Higurashi, Tokyo, all of (JP)

(73) Assignee: Victor Company of Japan, Ltd., Yokohama (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/754,530

(22) Filed: Nov. 21, 1996

(30) Foreign Application Priority Data

Feb. 13, 1996 (JP) .................................... 8-049442

(51) Int. Cl.[7] .................................... H04N 5/91
(52) U.S. Cl. .................. 386/95; 386/104; 386/112; 386/116
(58) Field of Search ............. 386/46, 96, 97, 386/100, 104, 64, 112, 95, 90, 116, 124; 360/32, 48, 130.23; 369/32, 59.25; H04N 5/91

(56) References Cited

U.S. PATENT DOCUMENTS

| | | |
|---|---|---|
| 4,541,093 | 9/1985 | Furuya et al. . |
| 4,672,471 | 6/1987 | Gouda . |
| 5,060,221 * | 10/1991 | Sako et al. .................. 369/59.25 |
| 5,276,561 * | 1/1994 | Fukami .......................... 360/32 |
| 5,457,579 * | 10/1995 | Bannai ............................ 386/64 |
| 5,491,590 * | 2/1996 | Endo et al. ................... 386/100 |
| 5,587,979 * | 12/1996 | Blutjgen ......................... 369/32 |

FOREIGN PATENT DOCUMENTS

| | | |
|---|---|---|
| 0508606 | 10/1992 | (EP) . |
| 0574889 | 12/1993 | (EP) . |
| 0726674 | 8/1996 | (EP) . |
| 407254862-A * | 10/1995 | (JP) . |

OTHER PUBLICATIONS

U.S.S.N. 08/675,478.

* cited by examiner

Primary Examiner—Huy Nguyen
(74) Attorney, Agent, or Firm—Connolly Bove Lodge & Hutz LLP

(57) ABSTRACT

A data recording apparatus is disclosed comprising memory circuits for storing video and sound data, and an error check code generation circuit for generating check codes for the data. The check code data is stored in a data block including the data and the check code data generated in accordance with the data. The apparatus includes an interleaving portion for reading the data and check code data for every stored data block and interleaving a predetermined number of the data blocks to provide an editing unit. The apparatus further includes a recording portion for recording the interleaved data blocks on a magnetic tape through helical scanning of every editing unit. The data may include video data and corresponding sound data. The video data is recorded on the magnetic tape on consecutive (t-p) tracks and the sound data is recorded on the magnetic tape on consecutive p tracks. One of a plurality of interleaving patterns is selected, and data indicative of the interleaving pattern is also recorded at a sub-code area on each track. A data reproducing apparatus including a de-interleaving portion for restoring the interleaved data block is also disclosed.

20 Claims, 10 Drawing Sheets

HELICAL SCAN DATA RECORDING APPARATUS AND A HELICAL SCAN DATA REPRODUCING APPARATUS

BACKGROUND OF THE INVENTION

1. Field of the Invention

This invention relates to a helical scan data recording apparatus and a helical scan data reproducing apparatus.

2. Description of the Prior Art

A helical scan data recording apparatus for recording digital data and recording error check code data in relation to the digital data is known.

FIG. 11 is an illustration of the prior art error check code data generation method. (n2−k2)×n1 bits of inner parity code and (n1−k1)×n2 bits of outer parity codes are generated to the k1×k2 digital data. Therefore, if there is data defected by a random error (data defection without a correlation) or a burst error (data defection with a correlation) it can be restored using the combination of the inner and outer parity codes. A combination of the inner and outer parity codes is referred to as a production code.

A first prior art data recording apparatus records the digital data and records the inner and outer parity codes and a prior art data reproducing apparatus reproduces the digital data with the defected data restored by using the inner and outer parity codes.

A second prior art data recording apparatus records data with data interleaved (changing an order of data on recording) to prevent defection of successive data due to a drop out during recording or reproducing data or during transmission of data. As the result, the defected data is diffused if there is a drop out. It is easy to restore the defected data which are diffused using the error check code.

Moreover, a prior art digital video tape recorder for recording data on a magnetic tape through helical scanning records video data and sound data on each track having a video data region and a sound data region.

SUMMARY OF THE INVENTION

The aim of the present invention is to provide an improved helical scan data recording apparatus and an improved helical scan data reproducing apparatus.

According to the present invention, a first helical scan data recording apparatus is provided, which comprises: a receiving portion for receiving data; memory circuits for storing the data from the receiving portion and check code data; an error check code generation circuit for reading the data in data blocks of a predetermined amount of data from the memory circuits, generating check codes in accordance with the read data, storing the check code data in the memory circuits to form a data block including the read data and the check code data generated in accordance with the read data; an interleaving portion for reading the data and check code data for every data block from the storing means and interleaving a predetermined number of the data blocks, which provide an editing unit; and a recording portion for recording the interleaved data blocks on a magnetic tape through helical scanning of every editing unit, wherein the data blocks in the editing unit are recorded on consecutive t tracks on the magnetic tape. The data includes video data and corresponding sound data. The video data is recorded on the magnetic tape on consecutive (t−p) tracks and the sound data is recorded on the magnetic tape on consecutive p tracks, t and p being natural numbers, p<t.

According to this invention, a second helical scan data recording apparatus is provided, which comprises: a receiving portion for receiving data; memory circuits for storing the data from the receiving portion and check code data; an error check code generation circuit for reading the data in data blocks of a predetermined amount of data from the memory circuits, generating check codes in accordance with the read data, storing the check code data in the memory circuits to form a data block including the read data and the check code data generated in accordance with the read data; an interleaving portion for reading the data and check code data for every data block from the storing means and interleaving a predetermined number of the data blocks in accordance with interleaving type data, the predetermined number of the data blocks providing an editing unit; and a recording portion for recording the interleaved data blocks on a magnetic tape through helical scanning of every editing unit, wherein the data blocks in the editing unit are recorded on consecutive t tracks on the magnetic tape. The data includes video data and corresponding sound data. The video data is recorded on the magnetic tape on consecutive (t−p) tracks and the sound data is recorded on the magnetic tape on consecutive p tracks, t and p being natural numbers, p<t, and the recording portion further records the interleaving type data on the magnetic tape as a sub-code data on the t tracks.

In the second helical scan data recording apparatus, the video data is recorded on consecutive (t−p) tracks to have V sectors on each of the (t−p) tracks, the sound data is recorded on consecutive p tracks to have U sectors on each of the p tracks, the sector corresponds to the data block, the interleaving means interleaves the data with a unit of k sectors, and V and U are natural numbers, and k is a common divisor of U and V.

According to this invention, a third helical scan data recording apparatus is provided, which comprises: a receiving portion for receiving data; memory circuits for storing the data from the receiving portion and check code data; an error check code generation circuit for reading the data in data blocks of a predetermined amount of data from the storing means, generating check codes in accordance with the read data, storing the check code data in the memory circuits to form a data block including the read data and the check code data generated in accordance with the read data; an interleaving portion for reading the data and check code data for every data block from the memory circuits and interleaving a predetermined number of the data blocks in accordance with interleaving type data, the predetermined number of the data blocks providing an editing unit; and a recording portion for recording the interleaved data blocks on a magnetic tape through helical scanning with a predetermined number of tracks formed for every editing unit and recording the interleaving type data on the magnetic tape as a sub-code data on every track.

According to this invention, a fourth helical scan data recording apparatus is provided, which comprises: a receiving portion for receiving data; memory circuits for storing the data from the receiving portion and check code data; an error check code generation circuit for reading the data in data blocks of a predetermined amount of the data from the memory circuits, generating check codes in accordance with the read data, storing the check code data in the memory circuits to form a data block including the read data and the check code data generated in accordance with the read data; an interleaving selection portion for selecting one from predetermined interleaving patterns in accordance with the editing unit and generating interleaving type data in accordance with the selected interleaving pattern; an interleaving portion for reading the data and check code data for every data block from the memory circuits and interleaving a predetermined number of the data blocks in accordance with the selected interleaving pattern, the predetermined number of the data blocks providing an editing unit; and a recording portion for recording the interleaved data blocks on a magnetic tape through helical scanning with a predetermined number of tracks formed for every editing unit and recording the interleaving type data on the magnetic tape as sub-code data on every track.

According to this invention, a helical scan data reproducing apparatus for reproducing data including error correction data on a magnetic tape and interleaving type data indicative of an interleaving pattern on a sub-code area on every track through a helical scanning is provided, it comprises a data reproducing portion for reproducing the data and interleaving type data from the magnetic tape; memory circuits for storing the data from the reproducing portion; a selection portion for selecting one from predetermined de-interleaving patterns in accordance with the interleaving type data from the data reproducing portion; a de-interleaving portion for de-interleaving the data in accordance with one of the de-interleaving patterns using the memory circuit; an error correction circuit for error-correcting the de-interleaved data using the error correction data; and an outputting portion for outputting the error-corrected data.

According to this invention, a fifth helical scan data recording apparatus is provided, which comprises: a receiving portion for receiving data; memory circuits for storing the data from the receiving portion and check code data; an interleaving portion for interleaving the data such that every predetermined number of first data blocks are interleaved, the first data blocks including the data from the memory circuits; an error check code data generation circuit for generating check code data in accordance with each of the first data blocks, storing the check code data in the memory circuits to provide second data blocks, each including the first data block and the check code data generated in accordance with each the first data block; and a recording portion for recording the second data blocks on a magnetic tape through helical scanning.

BRIEF DESCRIPTION OF THE DRAWINGS

The object and features of the present invention will become more readily apparent from the following detailed description taken in conjunction with the accompanying drawings in which.

The same or corresponding elements or parts are designated with like references throughout the drawings.

DETAILED DESCRIPTION OF THE INVENTION

Figure 1:
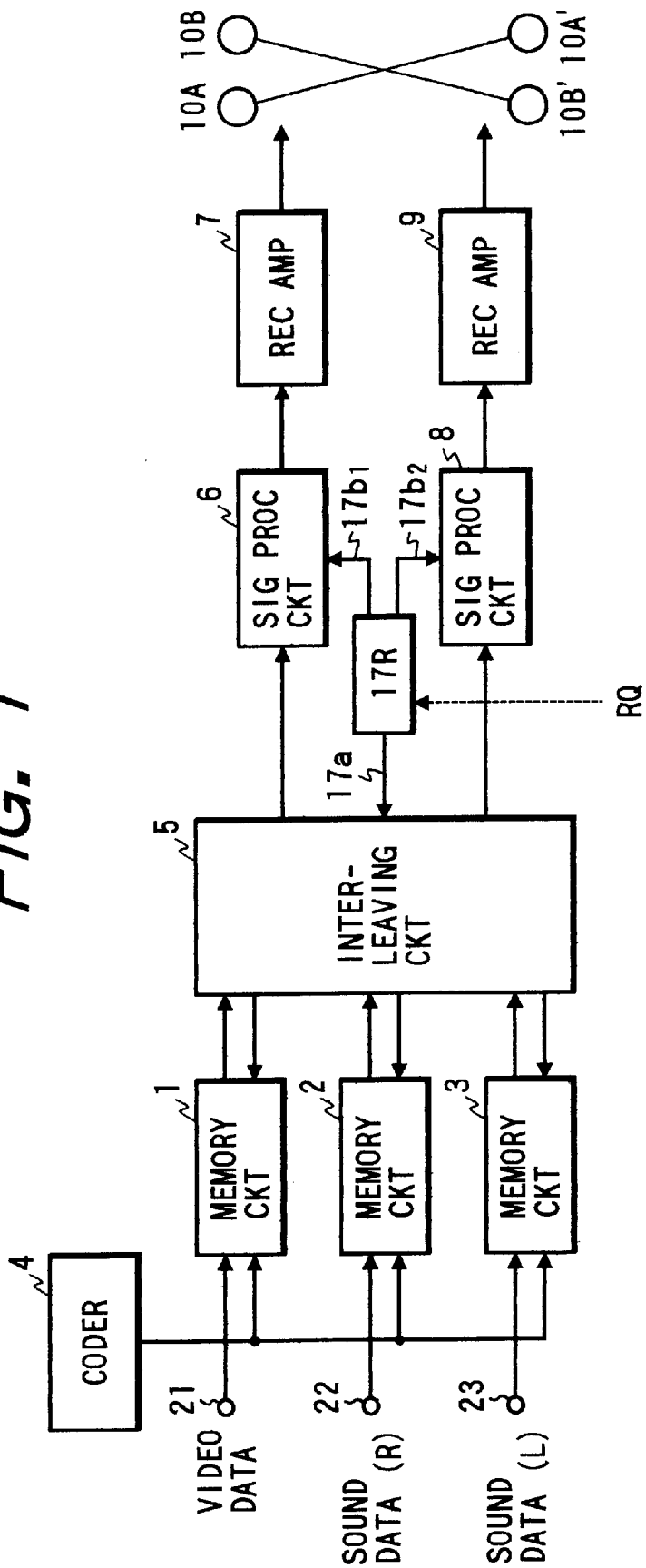
FIG. 1 is a block diagram of a helical scan data recording apparatus of an embodiment of this invention.

Hereinbelow will be described an embodiment of this invention.

At first, a method of recording input data including video data and sound data will be described. The helical scan data recording apparatus of this embodiment processes and records the video data and the sound data on a magnetic tape for every predetermined editing unit of the video and sound data. That is, the video data is recorded every m frames (fields), m being a natural number, as an editing unit and n channels of the sound data, n being a natural number, are recorded every m frames (fields) as the editing unit.

One editing unit of the video data and the sound data are recorded on successive t tracks (t is a natural number, for example, 30) on the magnetic tape, wherein the video data is recorded on successive (t–p) tracks (for example, 28 tracks) and the sound data is recorded on successive p tracks (p is a natural number p<t, for example two). The sound data for a period corresponding to the editing unit is lumped and recorded at a portion of a track pattern of one editing unit, so that an amount of sound data becomes large for each given period, i.e., an interval of the editing unit. Then, error correction processing and interleave processing (mentioned later) can be commonly effected between the video data and the sound data. Moreover, because the sound data is lumped with every editing unit and recorded on the tracks (sound tracks) independent from the tracks for video data (video tracks), recording a new sound data on the sound tracks which has been recorded can be readily provided.

The helical scan data recording apparatus of this embodiment comprises memory circuits 1 to 3 for storing the video data, sound data of a right channel and sound data of a left channel from input terminals 21 to 23 respectively. The apparatus further comprises, a coder 4 for reading and coding the video data, and the sound data from the memory circuits 1 to 3, in data blocks, every data block corresponding to a sector formed on a track on a magnetic tape, and for generating error check code data, and respectively storing the error check code data of the video data, the right channel of the sound data, and the left channel of the sound data in the memory circuits 1 to 3 again. The apparatus further comprises an interleaving circuit 5 for interleaving a predetermined number of data blocks (sectors) of the video data and the right and left channel of the sound data, including the error check code data within an editing unit. That is, the order of the data blocks or sectors of the video data and the right and left channel of sound data is changed. The apparatus further comprises an interleaving selection circuit 17R for selecting one from predetermined interleaving patterns and generating interleaving type data indicative of the selected interleaving pattern, data processing circuits 6 and 8 for attaching the interleaving type data to the video data and the sound data and processing (modulating) the data including the video data or the sound data and the interleaving type data to be recorded, and recording amplifiers 7 and 9 and helical scanning heads 10A, 10B, 10A', and 10B' for recording the processed data on the magnetic tape through helical scanning.

The video data and corresponding sound data of the right and left channels are supplied to the memory circuits 1 to 3 via the input terminals 21 to 23 respectively. The coder 4 reads data of the video data and the right and left channels of the sound data for every data block, i.e., for every sector and generates error check code data of the video data and the sound data, and stores the error check code data of the video data and the right and left channels of sound data to the memory circuits 1 to 3.

The memory circuits 1 to 3 store the video data, the error check code data accompanying the video data, and the right and left channels of the sound data and the error check code data accompanied with the sound data within one editing unit. Therefore, each of the memory circuits 1 to 3 has a capacity for storing the inputted data and the error check code data for the interval of the editing unit at least.

Figure 10:
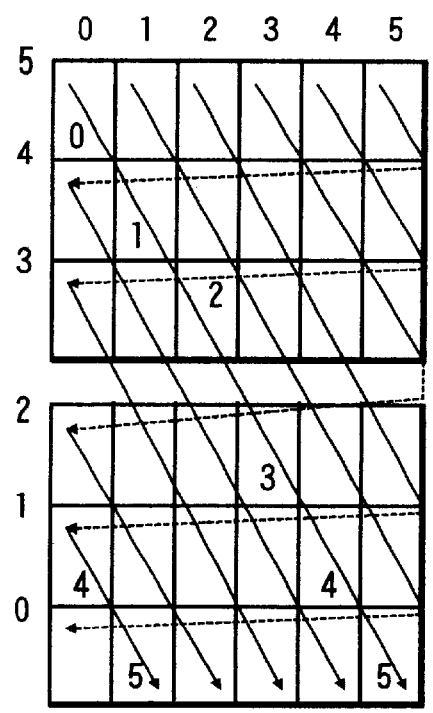
Figure 11:
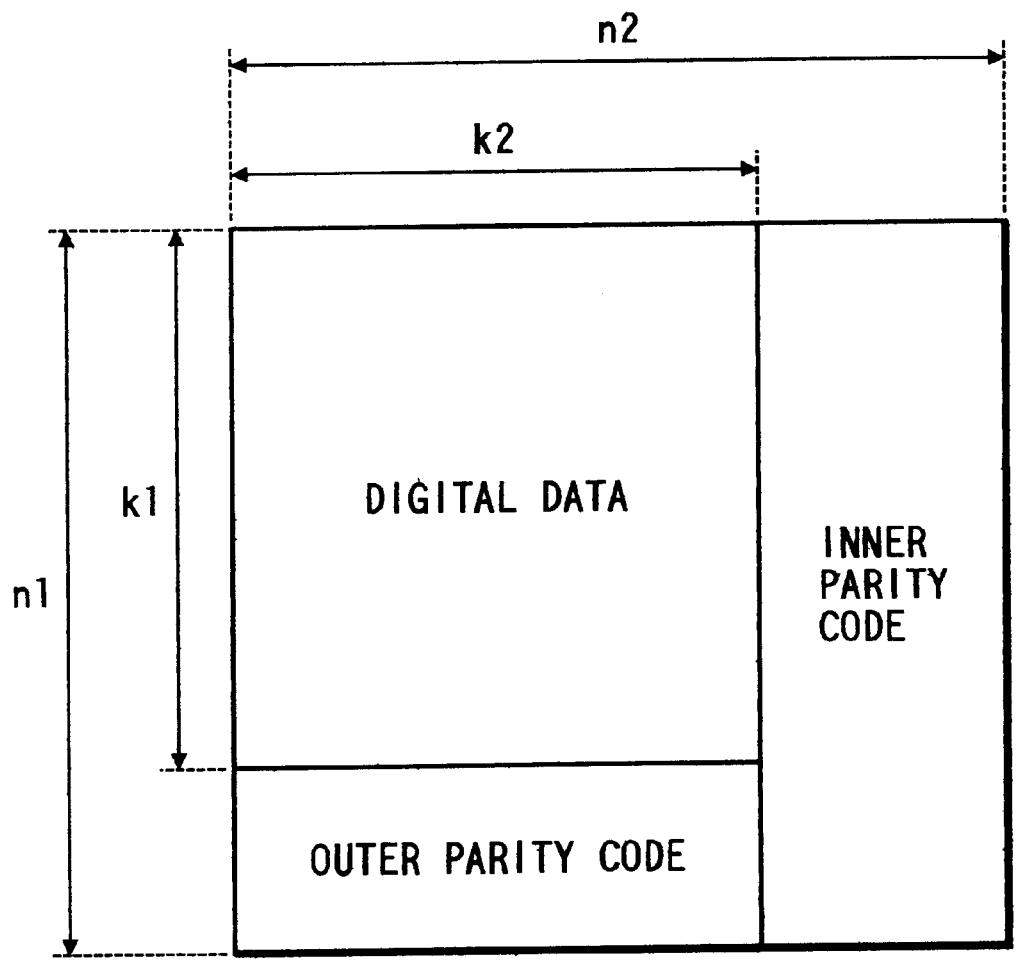
FIG. 11 is an illustration of the prior art error check code data generation method.

The coder 4 generates the inner parity codes and the outer parity codes in accordance with each sector of the video data and the right and left channels of the sound data and further generates production codes of the generated inner and outer parity codes. The inner and outer parity codes have sufficient bits to correct the data of each sector and are shown in FIG. 10. The coder 4 supplies the production codes of the video data and the right and left channels of the sound data to the memory circuits 1 to 3 for every sector as the error check code data.

Figure 2:
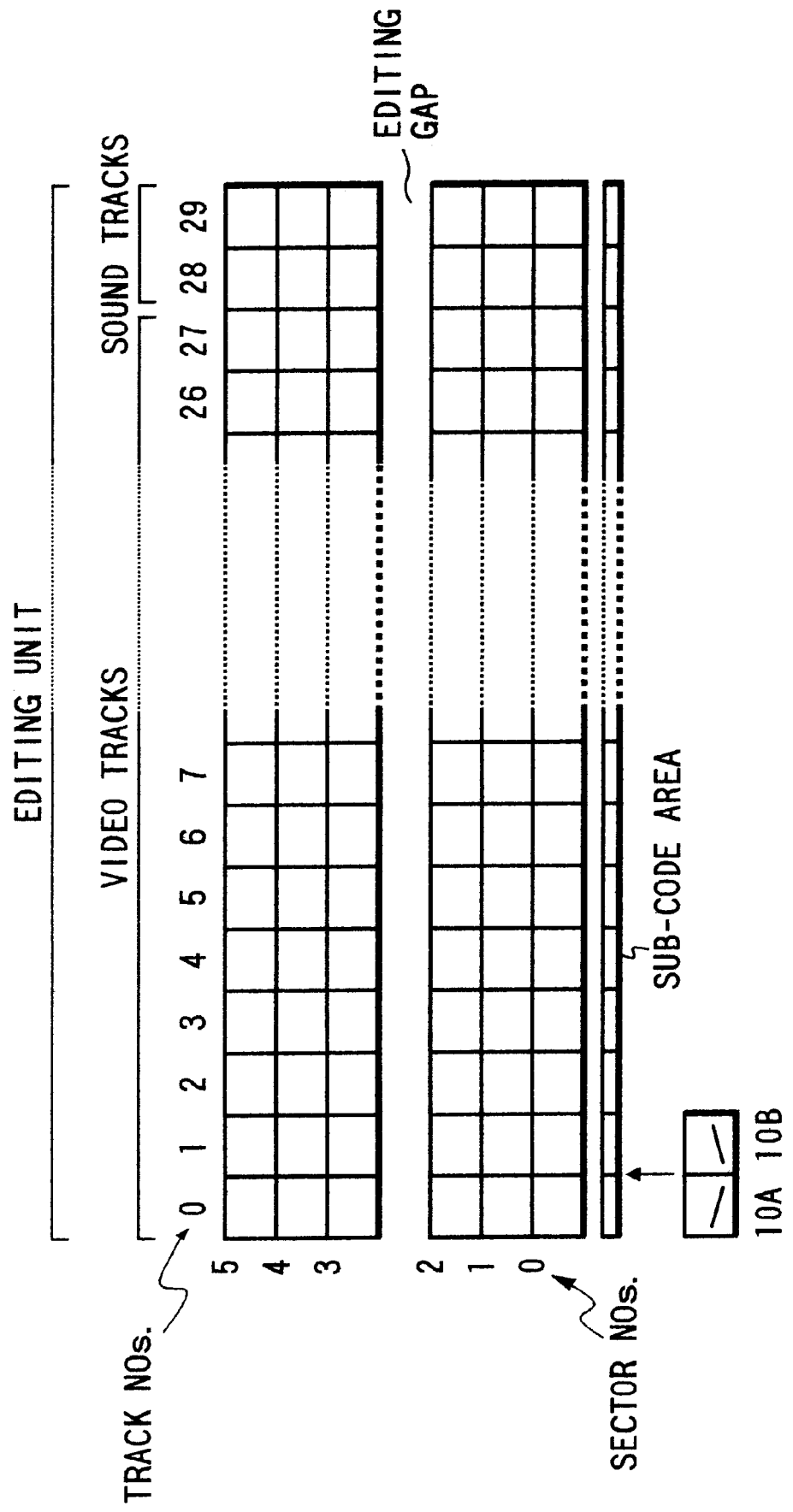
FIG. 2 is an illustration of this embodiment showing a track pattern.

The sector is a unit of recorded data on the magnetic tape, i.e., a data block having a predetermined number of bits or a predetermined amount of data. The video data and the right and left channels of the sound data and accompanying production codes are recorded on the magnetic tape as shown in FIG. 2. The amounts of data in a sector are common between the video data and the sound data. Therefore, the coder 4 commonly generates the error check codes, that is, the production codes, from the video data and the right and left channels of the sound data which are different types of data.

The error check codes generated by the coder 4 are supplied to the memory circuits 1 to 3 and stored therein. The video data and the right and left channels of sound data and the accompanying error check code data are read by the interleaving circuit 5 with address controlling such that data in a predetermined number of sectors in the editing unit are interleaved. That is, the order of sectors within the editing unit is changed in accordance with an interleaving type data 17*a,* that is, an interleaving processing is effected. In this embodiment, the interleaving processing is effected after generation of the error check code data. However, it is also possible to generate the error check codes after the interleaving processing. Moreover, generating the error check codes and the interleaving processing may be effected substantially at the same time.

The interleaving circuit 5 separates the interleaved sectors of data into sectors of data of a first recording system and sectors of data of a second recording system. The first system includes the data processing circuit 6, the recording amplifier 7 and heads 10A, and 10A', and a second system includes the data processing circuit 8, the recording amplifier 9, and heads 10B and 10B'. The interleaving circuit 5 supplies divided sectors of data to the data processing circuit 6 and the data processing circuit 8 for every sector. More specifically, the interleaving circuit 5 supplies the data to the data processing circuits 6 and 8 as shown by the track pattern in FIG. 2. That is, for example, the interleaving circuit 5 supplies the video data of 28 tracks×6 sectors and the sound data of two tracks×6 sector, i.e., data of thirty track×6 sectors to the first and second systems every two tracks.

Moreover, the interleaving selection circuit 17R generates the interleaving type data 17*a* automatically or in response to a request RQ and supplies interleaving type data 17*b*1 and 17*b*2 indicative of the interleaving pattern (type) to the data processing circuit 6 and 8 to be recorded at a sub-code area on the magnetic tape as shown in FIG. 2.

The data processing circuits 6 and 8 modulate the data supplied from the interleaving circuit 5 and the interleaving type data to be recorded at a sub-code area on the magnetic tape. The recording amplifiers 7 and 9 generate recording data from the data processing circuits 6 and 8 to record the data on the magnetic tape by the heads 10A, 10A', 10B, and 10B' as shown in FIG. 2.

The rotary heads 10A and 10A' have the same azimuth and similarly, the rotary heads 10B and 10B' have the same azimuth but the rotary heads 10A and 10B have different azimuths and similarly, the rotary heads 10A' and 10B' have different azimuths. The rotary heads 10A and 10B are provided adjacent to each other as shown in FIG. 2 and form combination heads. Similarly, the rotary heads 10A' and 10B' are provided adjacent to each other to form combination heads and are 180° apart from the heads 10A and 10B. Therefore, the rotary heads 10A, 10B, 10A', and 10B' record the data including the video data, the right and left channels of sound data, the error check code data, and other control data on the magnetic tape, with the track format shown in FIG. 2 being formed.

The combination heads 10A and 10B record the recording data on track No. 0 and No. 1 at the same time and with rotation of a rotary cylinder (not shown), the combination heads 10A' and 10B' record the recording data on track No. 2 and track No. 3 at the same time. These combination heads 10A, 10B, 10A', and 10B' successively form two consecutive tracks.

The interleaving circuit 5 interleaves the data to form the track pattern as shown in FIG. 2. That is, the video data with the error check code data is recorded from track No. 1 to No. 27 and the sound data of the right and left channels with the error check code data is recorded on the following two consecutive two tracks of No. 28 and No. 29.

The video data and the sound data is recorded on the different tracks on the magnetic tape, so that respective data can be edited independently.

Moreover, an editing gap is provided between the sectors Nos. 3 and 4 on the magnetic tape, so that it is possible to edit the data between the sectors Nos. 0 to 2 and sectors Nos. 3 to 5 independently.

As mentioned, the video data and the sound data having a common data amount (sector) is recorded on the magnetic tape, so that the same error check coding is used between the video data and the sound data, that is, the same coder 4 is commonly used between the video data and the sound data. As the result, the structure of the data recording apparatus of this embodiment can be made simple.

Further, the interleaving is made with the unit of sector, so that the interleaving circuit 5 is made simple.

Figure 3:
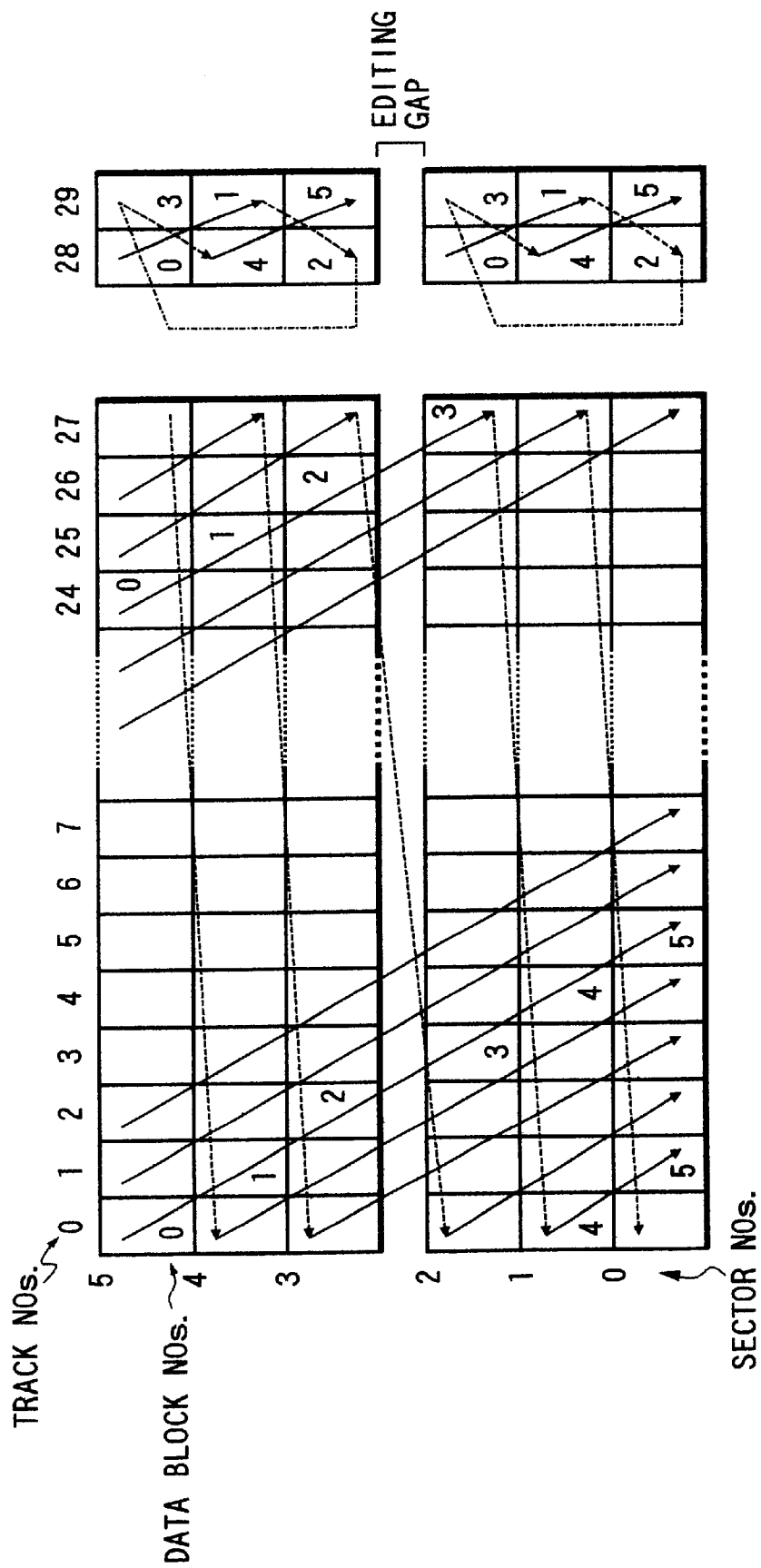
FIGS. 3 to 5 are illustrations of this embodiment showing a data recording pattern with interleaving.
Figure 4:
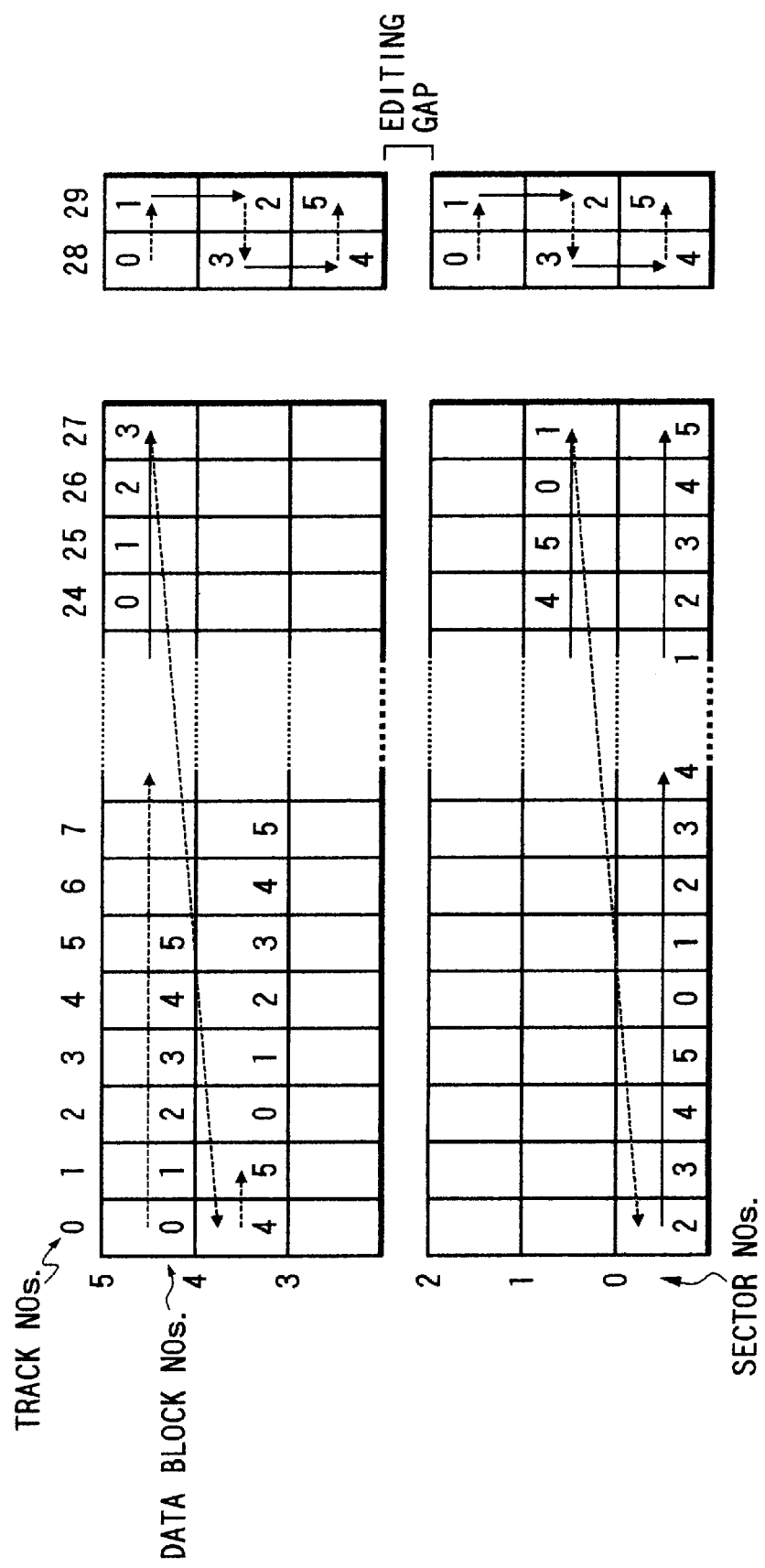

FIGS. 3 and 4 are illustrations of this embodiment showing track patterns. In FIGS. 3 and 4, the video data is recorded on consecutive twenty-eight tracks, each track including V sectors, for example 6 sectors, and the right and left channels of sound data are recorded on consecutive two tracks, each track including U tracks (V and U are natural numbers) as similar to the tracks shown in FIG. 2.

In this condition, the interleaving circuit 5 interleaves k sectors over k tracks, wherein k is a common divisor of U and V (k is a natural number). In the example mentioned above, V=6 and U=6, so that k=6, 3, and 2. However, it is better that a unit of interleaving sectors is as large as possible, so that the k is determined to be 6 which is a maximum common divisor. Then, the interleaving circuit 5 interleaves the sectors every six sectors.

As mentioned, the video data and the sound data is interleaved for a predetermined number of sectors, for example, six sectors, so that a structure of the interleaving circuit 5 is made simple.

FIG. 3 shows an example of interleaving. In FIG. 3, there are 28 tracks in one editing unit and each track includes six sectors. The video data of 28 tracks in one editing unit is recorded such that video data in every sector (data block) is recorded on the sector having the corresponding sector number with the track number shifted. That is, the video data in a data block having No. 0 is recorded on a track of No. 0 at a sector of No. 5, the video data in a data block having No. 1, on a track of No. 1 at the sector of No. 4, the video data in a data block having No. 2, on a track of No. 2 at the sector of No. 3, the video data in a data block having No. 3, on a track of No. 3 at the sector of No. 2, the video data in a data block having No. 4, on a track of No. 4 at the sector of No. 1, and the video data in a data block having No. 5, on a track of No. 5 at the sector of No. 0.

On the other hand, on a track of No. 24, the video data in a data block having No. 0 is recorded on a track of No. 24 at a sector of No. 5, the video data in a data block having No. 1, on a track of No. 25 at the sector of No. 4, the video data in a data block having No. 2, on a track of No. 26 at the sector of No. 3, the video data in a data block having No. 3, on a track of No. 27 at the sector of No. 2, the video data in the following data block having No. 4, on a track of No. 0 at the sector of No. 1, and the video data in a data block having No. 5, on a track of No. 2 at the sector of No. 0. Other video data in this editing unit is recorded similarly to provide the interleaving processing.

That is, the video data in one editing unit is recorded such that video data in every data block is recorded on the corresponding sector with track No. shifted. In other words, the successive data blocks of video data in the editing unit are recorded on the magnetic tape along the solid lines and chain lines with arrows in FIG. 3 starting from the track No. 0 at the sector No. 5 to track No. 4 at the sector No. 0 along the solid lines and chain lines having arrows.

As mentioned, the video data in every editing unit is recorded with interleaving on the region of 28 tracks×6 sectors.

On the other hand, if there are two channels of, i.e., the right and left channels of, sound data, the sound data is recorded as follows:

The right channel of the sound data of six data blocks is recorded such that the sound data in a data block having No. 0 is recorded on a track of No. 28 at a sector of No. 5, the sound data in a data block having No. 1, on a track of No. 29 at the sector of No. 4, the sound data in a data block having No. 2, on a track of No. 28 at the sector of No. 3, the sound data in a data block having No. 3, on a track of No. 29 at the sector of No. 5, the sound data in a data block having No. 4, on a track of No. 28 at the sector of No. 4, and the sound data in a data block having No. 5, on a track of No. 29 at the sector of No. 3.

The left channel of the sound data of six data blocks is recorded such that the sound data in a data block having No. 0 is recorded on a track of No. 28 at a sector of No. 2, the sound data in a data block having No. 1, on a track of No. 29 at the sector of No. 1, the sound data in a data block having No. 2, on a track of No. 28 at the sector of No. 0, the sound data in a data block having No. 3, on a track of No. 29 at the sector of No. 2, the sound data in a data block having No. 4, on a track of No. 28 at the sector of No. 1, and the sound data in a data block having No. 5, on a track of No. 29 at the sector of No. 0. Therefore, the interleaving of the right and left channels is effected independently with the editing gap between the right and left channels. Therefore, it is easy to renew the sound data once the sound data has been recorded.

FIG. 4 shows another type of interleaving pattern. The video data in one editing unit is recorded such that the video data of the data block of No. 0 is recorded on the track of No. 0 at the sector of No. 5, the video data in a data block having No. 1, on a track of No. 1 at the sector of No. 5, the video data in a block having No. 2, on a track of No. 2 at the sector of No. 5, the video data in a block having No. 3, on a track of No. 3 at the sector of No. 5, - - - , on track of No. 27, the video data in a data block having No. 3 is recorded at the sector of No. 5, and the video data in the following block having No. 4, on a track of No. 0 at the sector of No. 4. Finally, the video data in the last data block in this editing unit, having No. 5, is recorded on the track of No. 27 at the sector of No. 0.

On the other hand, if there are two channels of, i.e., the right and left channels of, sound data, the sound data is recorded as follows:

The right channel of the sound data of six data blocks is recorded such that the sound data in a data block having No. 0 is recorded on a track of No. 28 at a sector of No. 5, the sound data in a data block having No. 1, on a track of No. 29 at the sector of No. 5, the sound data in a data block having No. 2, on a track of No. 29 at the sector of No. 4, the sound data in a data block having No. 3, on a track of No. 28 at the sector of No. 4, the sound data in a data block having No. 4, on a track of No. 28 at the sector of No. 3, and the sound data in a data block having No. 5, on a track of No. 29 at the sector of No. 3.

The left channel of the sound data of six data blocks is recorded such that the sound data in a data block having No. 0 is recorded on a track of No. 28 at a sector of No. 2, the sound data in a data block having No. 1, on a track of No. 29 at the sector of No. 2, the sound data in a data block having No. 2, on a track of No. 29 at the sector of No. 1, the sound data in a data block having No. 3, on a track of No. 28 at the sector of No. 1, the sound data in a data block having No. 4, on a track of No. 28 at the sector of No. 0, and the sound data in a data block having No. 5, on a track of No. 29 at the sector of No. 0. Therefore, the interleaving of the right and left channels is effected independently with the editing gap between the right and left channels. Therefore, it is easy to renew the sound data once the sound data has been recorded.

Another example of recording the sound data will be described. In the examples shown in FIGS. 3 and 4, there are two channels of sound data and in one editing unit there is a data amount corresponding to six sectors of the sound data in each channel. This is provided in the condition that a sampling frequency is 48 KHz and the number of bits of the sound data is 16 in each channel.

Figure 5:
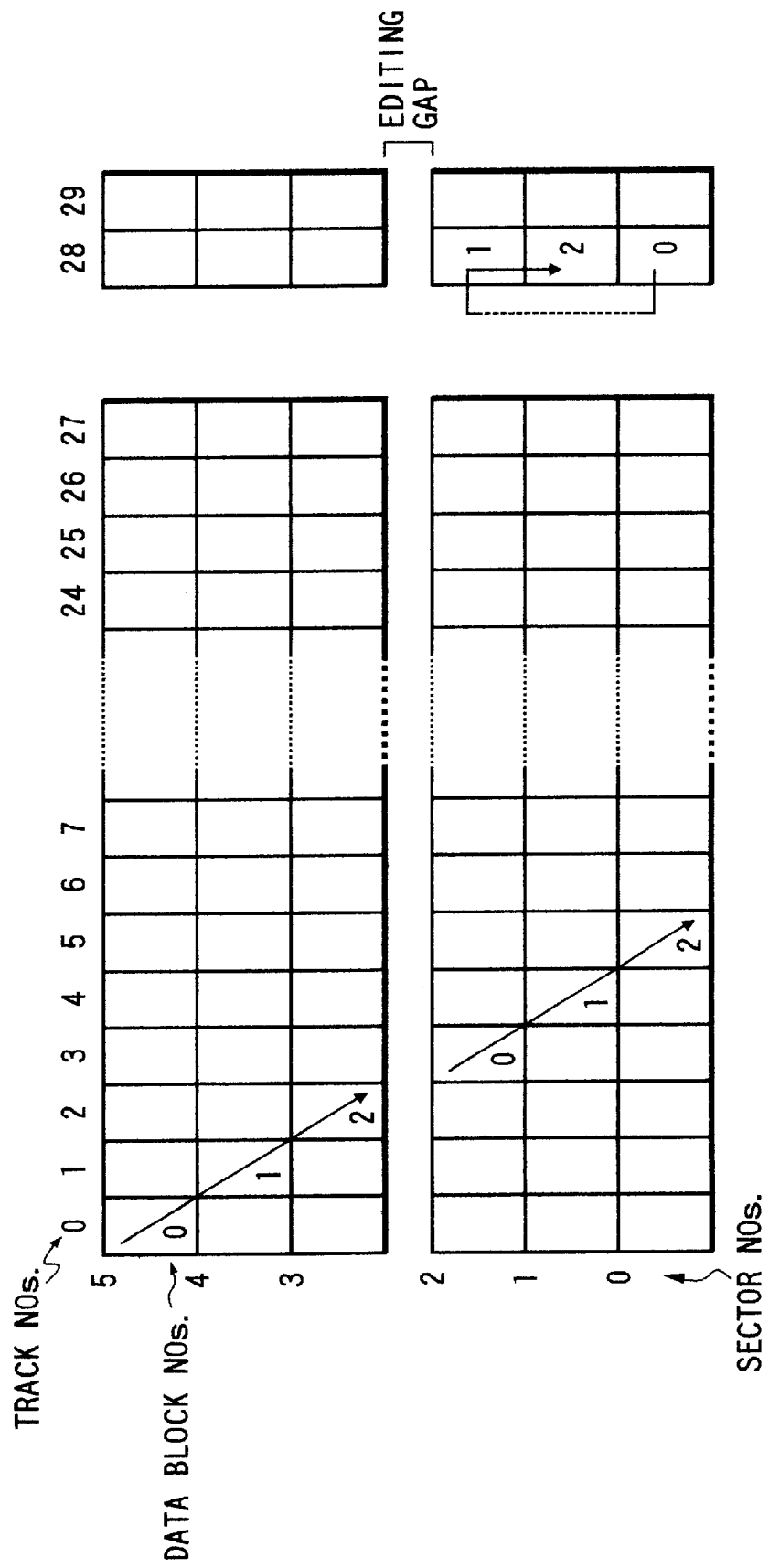

Contrariwise, if it is assumed that the sampling frequency is 32 KHz, the number bits of data each channel is 12 and there are four channels of the sound data. Because there are four channels of the sound data, three sectors are assigned to each channel. Then, V=6, U=3, so that the common divisor k=3. Accordingly, the video data and the sound data are interleaved among every three sectors as shown in FIG. 5. Then, both the video and sound data are interleaved among the common number of sectors and the sound data can be edited for every channel.

The four channels of sound data data may be interleaved as follows:

Every two channels of sound data are combined to provide another two channels of data and this other two channels of data are recorded on six sectors. The sound data is recorded similarly to the example shown in FIGS. 3 and 4. In this case, the sound data cannot be edited for every channel.

When the video and sound data recorded with interleaving as mentioned above are reproduced with de-interleaving which restores, the order of the interleaved sectors in one editing unit is restored. In other words, data read from the magnetic tape is subjected to interleaving which is an inversion of the interleaving of recording data. However, if there are various interleaving types, which type (pattern) of interleaving should be effected in the reproduction processing is determined by the interleaving type data stored at the sub-code area.

The helical scan data recording apparatus of this embodiment records the interleaving type data on the magnetic tape at the sub-code area. The interleaving selection circuit 17R generates the interleaving type data including the interleaving pattern shown in FIGS. 4 to 5 and the number of sectors among which the interleaving is effected. On reproduction, the interleaving selection circuit 17P receives the interleaving type data from the magnetic tape and a de-interleaving circuit effects de-interleaving on the basis of the interleaving type data to reproduce the order of the data blocks of the video data and sound data interleaved.

Figure 6:
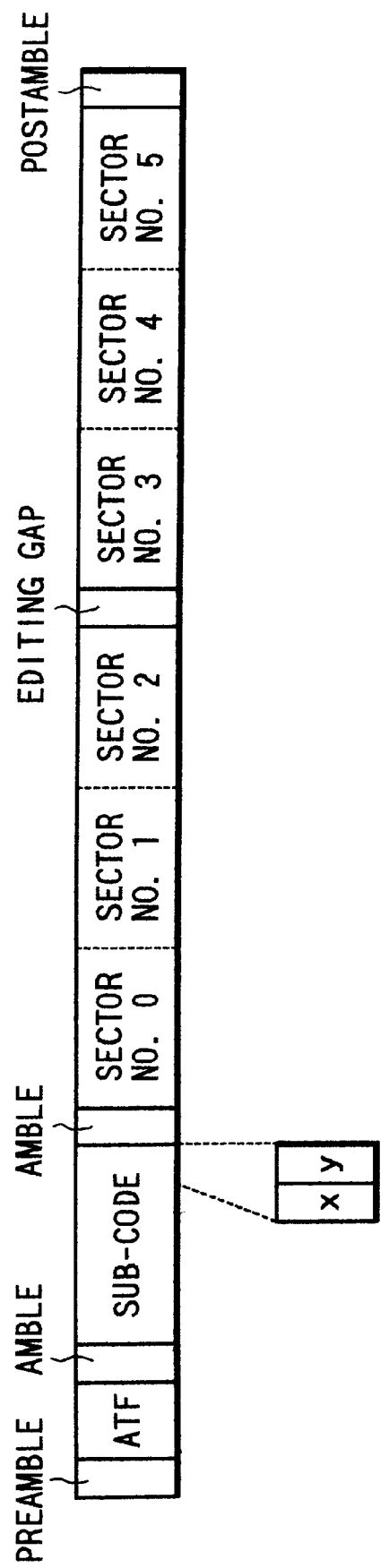
FIG. 6 is an illustration of this embodiment showing a track format.

FIG. 6 is a track format of this embodiment.

As shown in FIG. 6, on the magnetic tape, various data are recorded in addition to the video data and the sound data. For example, ambles including special data group are provided to edit the video and the sound data independently, wherein at the top of the track, a preamble, and at the end of the track, a post-amble are provided. Moreover, to each sector for recording the video data and the sound data, identification data (ID), synchronizing data (Sync) or the like are added. Thus, a synchronizing clock can be reproduced, so that data in the same track can be edited.

Moreover, after the preamble provided at the top of the track, the sub-code data is recorded. The sub-code includes the interleaving type data and or the like.

The interleaving type data has two bit of data (x, y). This data is generated by the interleaving selection circuit 17R and added to the recording data. For example, in the case that the interleaving pattern shown in FIG. 3, wherein video data is interleaved every six sectors, the interleaving type data has data of (0. 0) for the video data and for the sound data, the interleaving type data has data of (1, 0). In the case of the interleaving pattern shown in FIG. 4, wherein video data is interleaved every six sectors, the interleaving type data has data of (0. 1) for the video data and the interleaving type data has data of (1, 1) for the sound data.

On reproduction, the interleaving selection circuit 17P receives the interleaving type data reproduced and judges the interleaving pattern, and selects a type of interleaving in accordance with the reproduced interleaving type data to effect de-interleaving which is inversion of the interleaving by the interleaving circuit 5 to reproduce the order of data blocks of the video data and the sound data.

If the interleaving pattern is fixed, it is sufficient to distinguish the interleaving pattern of the video data from that of the sound data. In such a case, the interleaving type data may be omitted by using other data indicative of type of tracks between the video data and sound data which is recorded on every track.

However, if the interleaving patterns are predetermined but an interleaving pattern is different for a particular helical scan data recording apparatus, it is necessary to reproduce the data interleaved with the different pattern. In that case, the interleaving type data is generated by the interleaving selection circuit 17R and recorded on the magnetic tape.

Moreover, it is also possible that one interleaving pattern is selected from a plurality of predetermined interleaving patterns. In that case, on recording, the interleaving selection circuit 17R automatically selects an optimum interleaving pattern and the number of sectors interleaved from the predetermined interleaving patterns in accordance with a type of the data to be recorded. The interleaving circuit 5 effects the interleaving processing in accordance with the selected interleaving pattern and the interleaving selection circuit 17R records the interleaving type data on the magnetic tape.

Figure 7:
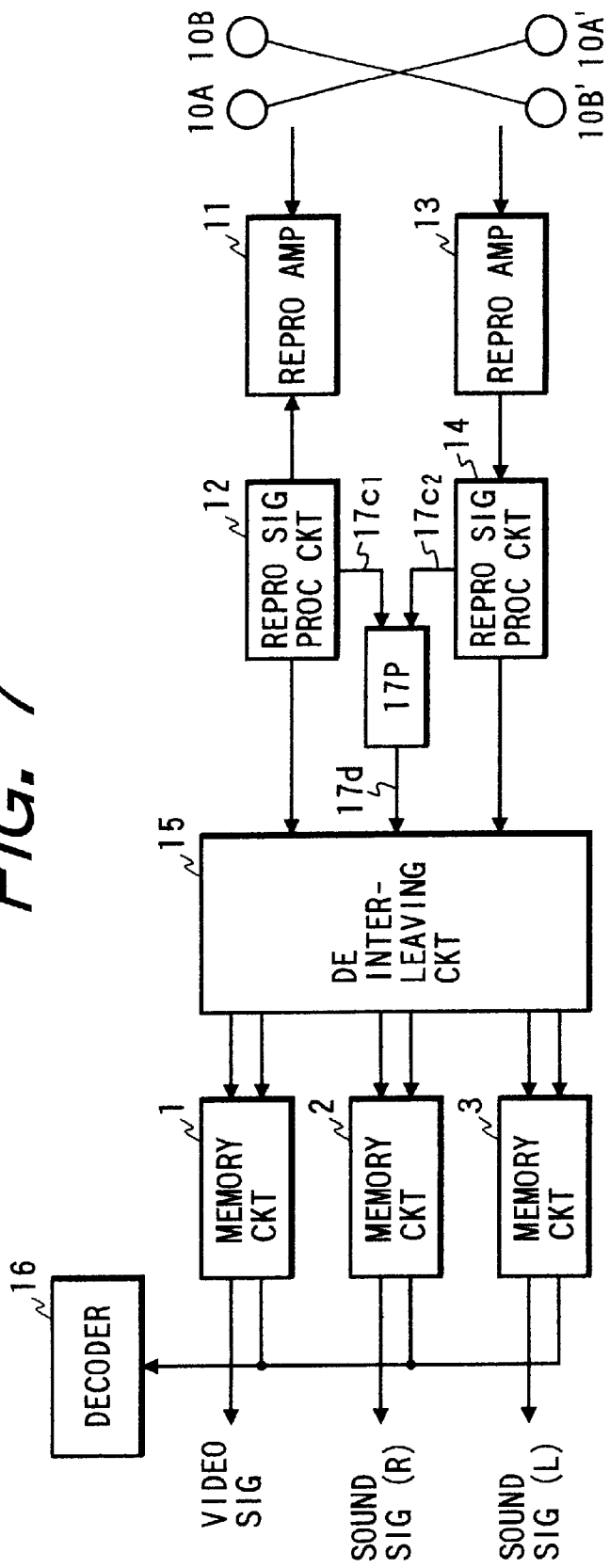
FIG. 7 is a block diagram of a helical scan data reproducing apparatus of this embodiment.

A helical scan data reproducing apparatus of this embodiment will be described. FIG. 7 is a block diagram of the helical scan data reproducing apparatus of this embodiment.

The helical scan data reproducing apparatus of this embodiment comprises the rotary heads 10A, 10B, 10A', and 10B' for reproducing the recorded data on the magnetic tape, reproducing amplifiers 11 and 13 for amplifying the reproduced data from the magnetic heads 10A, 10B, 10A', and 10B', reproduced data processing circuits 12 and 14 for demodulating the reproduced data from the reproducing amplifiers 11 and 13, interleaving selection circuit 17P for receiving the interleaving type data 17c1 and 17c2 from the reproduced data processing circuits 12 and 14 and outputting interleaving type data 17d, a de-interleaving circuit 15 for interleaving data from the reproduced data processing circuit 12 and 14 in accordance with the interleaving type data from the interleaving selection circuit 17P, memory circuits 1 to 3 for storing video data and right and left channels of sound data from the de-interleaving circuit 15, a decoder 16 for checking errors in the data in the memory circuits 1 to 3 with reference to the reproduced error check codes and correcting data if there is an error, the memory circuits 1 to 3 outputting the reproduced video data and the right and left channels of sound data after demodulation, interleaving, and error correction.

An operation will be described.

The rotary heads 10A, 10B, 10A', and 10B' reproduce the recorded data on the magnetic tape. The reproducing amplifiers 11 and 13 amplify the reproduced data from the magnetic heads 10A, 10B, 10A', and 10B'. The reproduced data processing circuit 12 demodulates the reproduced data from the reproducing amplifiers 11 and 13 and supplies video data and the right and left channels of sound data to the de-interleaving circuit 15 and the interleaving type data, as to the video data and the sound data, reproduced from the sub-code area on the magnetic tape to the interleaving selection circuit 17P. The interleaving selection circuit 17P receives the interleaving type data of the video data and sound data from the reproduced data processing circuits 12 and 14 and sends it to the de-interleaving circuit 15. The de-interleaving circuit 15 de-interleaves data from the reproduced data processing circuits 12 and 14 in accordance with the interleaving type data from the interleaving selection circuit 17R using the memory circuits 1 to 3 with address data to the memory circuits 1 to 3 controlled to restore the order of the sectors of the video data and the right and left channels of sound data. The memory circuits 1 to 3 store the reproduced video data and right and left channels of sound data from the de-interleaving circuit 15. The decoder 16 checks errors in the data in the memory circuits 1 to 3 with reference to the reproduced error check codes, i.e., the inner parity codes and the outer parity codes and corrects data if there is an error. The memory circuits 1 to 3 supply the reproduced video data and the right and left channels of sound data after demodulation, interleaving, and error correction to a transmission line, not shown. The de-interleaving can be effected after the error correction because de-interleaving and the error correction are made for every sector.

A helical scan data recording and reproducing apparatus of this embodiment will be described.

Figure 8:
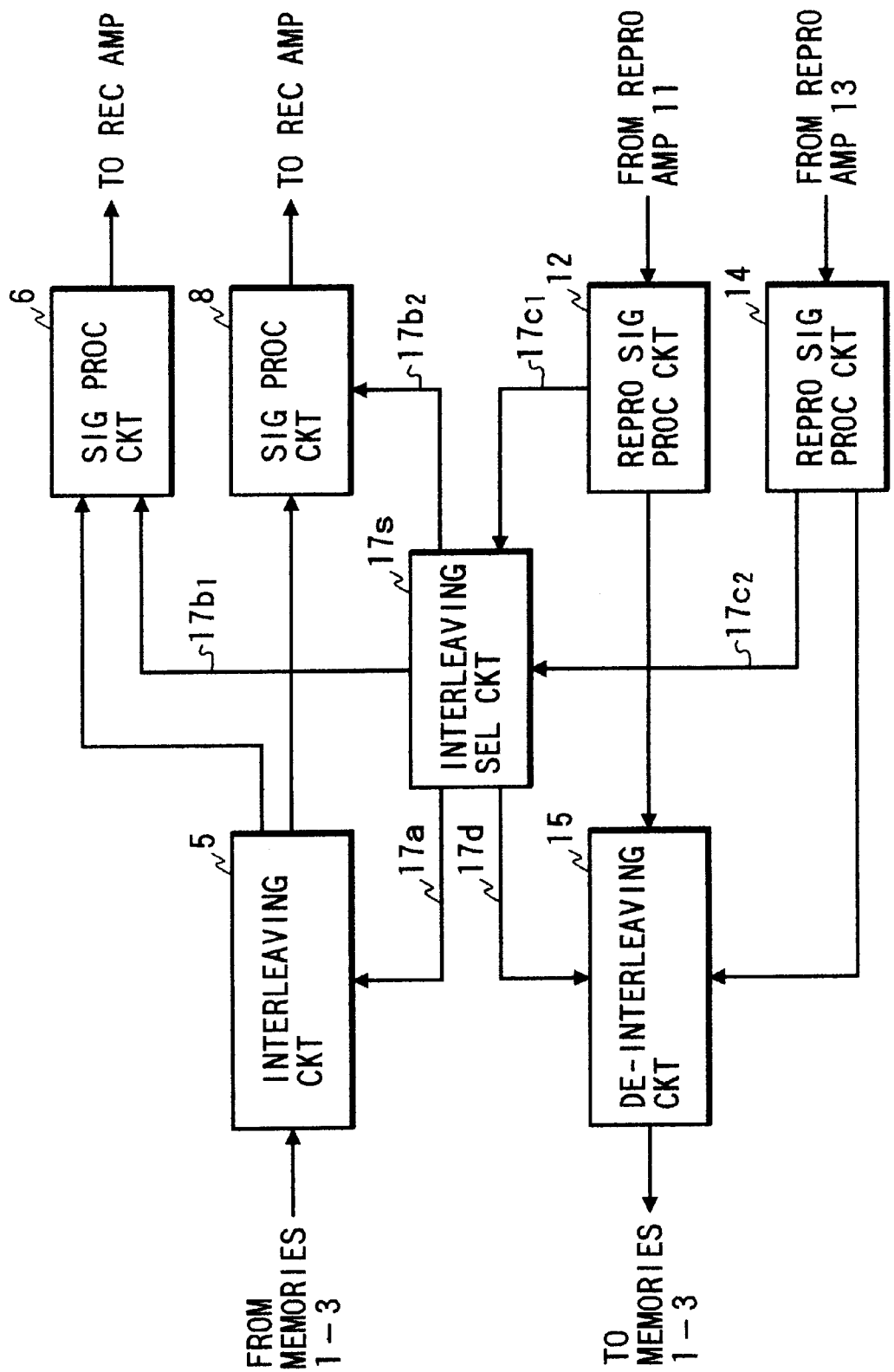
FIG. 8 is a partial block diagram of helical scan data recording and reproducing apparatus of a this embodiment.
Figure 9:
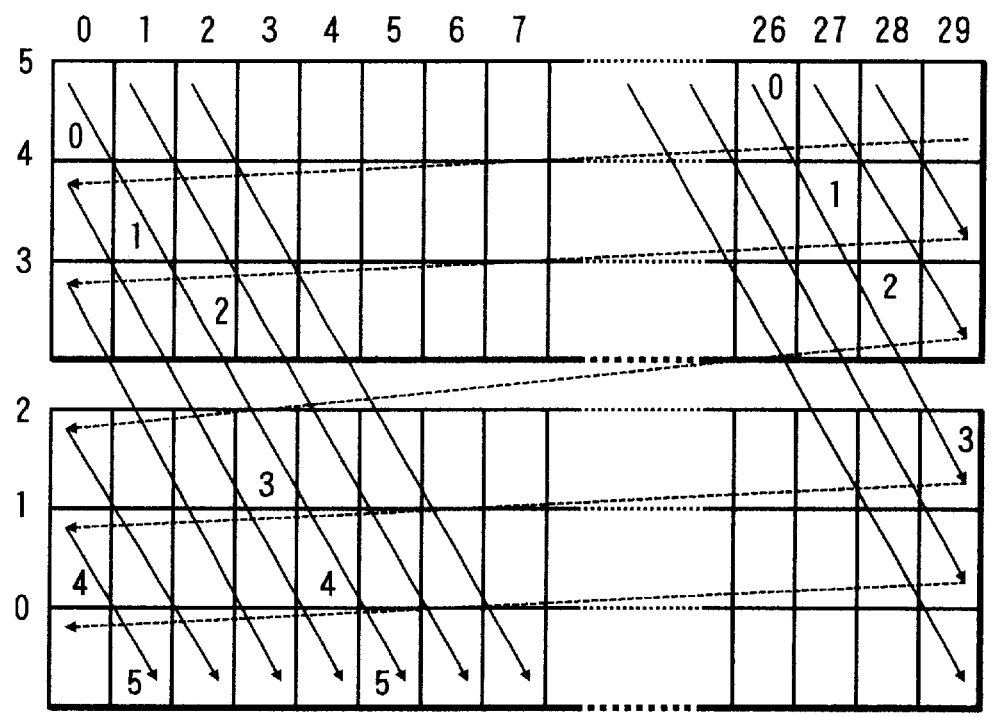
FIGS. 9 and 10 are illustrations of this embodiment showing another data recording pattern with interleaving.

FIG. 8 is a partial block diagram of the helical scan data recording and reproducing apparatus of this embodiment, wherein elements in FIGS. 1 and 8 are common to this digital recording and reproducing apparatus, except an interleaving selection circuit 17s reproducing data processing circuit 12 and 14, and the de-interleaving circuit 15 are not shown in FIG. 1.

The helical scan data recording and reproducing apparatus of this embodiment comprises memory circuits 1 to 3 for recording the video data, sound data of a right channel and sound data of a left channel respectively, a coder 4 for reading and coding the video data and the sound data from the memory circuits 1 to 3, in data blocks of a predetermined amount of data corresponding to a sector formed on a track on a magnetic tape, generating error check codes, and storing the error check code data of the video data and the right channel of the sound data and the left channel of the sound data in the memory circuits 1 to 3, an interleaving circuit 5 for interleaving a predetermined number of blocks (sectors) of the video data and the right and left channel of the video data including the error check codes within an editing unit. That is, the order of the blocks or sectors of the video data and the right and left channels of sound data is changed. The apparatus further comprises an interleaving selection circuit 17s for generating interleaving type data 17b1 and 17b2 and supplying interleaving type data 17b1 and 17b2 to the signal processing circuits 6 and 8, data processing circuits 6 and 8 for processing the interleaved data, recording amplifiers 7 and 9 and helical scanning heads 10A, 10B, 10A', and 10B' for recording the processed data on the magnetic tape and reproducing the recorded data on the magnetic tape in a reproducing mode, reproducing amplifiers 11 and 13 for amplifying the reproduced data from the magnetic heads 10A, 10B, 10A', and 10B', and reproduced data processing circuits 12 and 14 for demodulating the reproduced data from the reproducing amplifiers 11 and 13. The apparatus further comprises an interleaving selection circuit 17s for receiving the interleaving type data 17c1 and 17c2 from the reproduced data processing circuit 12 and 14 and outputting interleaving type data 17d, de-interleaving circuit 15 for interleaving data from the reproduced data processing circuit 12 and 14 in accordance with the interleaving type data 17d from the interleaving selection circuit 17s, memory circuits 1 to 3 for storing video data and right and left channels of sound data from the de-interleaving circuit 15. The apparatus further comprises a decoder 16 for checking errors in the data in the memory circuits 1 to 3 with reference to the reproduced error check code data and correcting data if there is an error, the memory circuits 1 to 3 outputting the reproduced video data and the right and left channels of sound data after demodulation, interleaving, and error correction. The interleaving selection circuit 17s includes the interleaving selection circuits 17p and 17r.

In the recording mode, the memory circuits 1 to 3 receive and store the video data and the right and left channels of sound data respectively. The coder 4 reads the video data and the sound data for every data block from the memory circuits 1 to 3 and generates error check code data, and stores the error check code data of the video data and the right and left channels of the sound data in the memory circuits 1 to 3 to accompany the stored video data and the right and left channels of sound data. The interleaving circuit 5 interleaves a predetermined number of data blocks (sectors) of the video data and the right and left channel of the sound data including the error check codes within an editing unit. That is, the order of the data blocks or sectors of the video data and the right and left channel of sound data is changed. The interleaving selection circuit 17s determines an interleaving pattern of the video data and the sound data and supplies interleaving, type data 17a including the interleaving patterns to the interleaving circuit 5 which interleaves the video data and the sound data in accordance with the interleaving type data 17a from the interleaving selection circuit 17s to have the interleaving patterns of the video data and the sound data and supplies the interleaving type data 17b1 and 17b2 to the data processing circuits 6 and 8 to record the interleaving type data at the sub-code area. The data processing circuits 6 and 8 recess and modulate the interleaved video and sound data and the interleaving type data. The recording amplifiers 7 and 9 and helical scanning heads 10A. 10B, 10A', and 10B' record the processed data on the magnetic tape in the recording mode.

In the reproducing mode, the reproducing amplifiers 11 and 12 amplify the reproduced data from the magnetic heads 10A, 10B, 10A', and 10B'. The reproduced data processing circuits 12 and 14 demodulate the reproduced data from the reproducing amplifiers 11 and 13. The interleaving selection circuit 17s receives the interleaving type data 17c1 and 17c2 from the reproduced data processing circuits 12 and 14 and supplies the interleaving type data 17d to the de-interleaving circuit 15. The de-interleaving circuit 15 de-interleaves the video data and the sound data from the produced data processing circuits 12 and 14 in accordance with the interleaving type data 17d from the interleaving selection circuit 17s to restore the order of data block of the video data and the sound data using the memory circuits 1 to 3. The decoder 16 checks errors in the data in the memory circuits 1 to 3 with reference to the reproduced error check code data and corrects data if there is an error. The memory circuits 1 to 3 supply the reproduced video data and the right and left channels of sound data after demodulation, interleaving, and error correction to the transmission line (not shown).

In the above-mentioned, the recorded or reproduced data is the video data and the sound data. However, the helical scan data recording apparatus, the helical scan data reproducing apparatus, and the helical scan data recording and reproducing apparatus can also deal with data other than the video data and the sound data.

For example, the helical scan data recording apparatus records digital data from a computer (not shown) for every editing unit mentioned above. That is, the helical scan data recording apparatus records the digital data to have the editing unit having 30 tracks, each track including six sectors. The interleaving is effected among 6 (sectors)×30 (tracks)=180 sectors. If this apparatus has three data inputs and three memory circuits as shown in FIG. 1, this apparatus may be commonly used as a digital video and sound data recording apparatus and as a digital data recorder. Similarly, a helical scan data reproducing apparatus and helical scan data recording and reproducing apparatus for dealing with data from a computer, for example, and also which can deal with video data and the sound data with the editing unit, can be provided.

When such a helical scan data recording apparatus records the digital data, the interleaving is effected as shown in FIG.

9. However, in this case the interleaving can be effected every twelve sectors, that is, two tracks×six sectors and further, the digital data can be also interleaved using the interleaving pattern as shown in FIG. 4. In both cases, when recording, the interleaving type data is recorded at the sub-code area and reproduced to effect de-interleaving corresponding to the interleaving in accordance with the reproduced interleaving type data.

Moreover, the error check code data is generated for every sector similarly to the case of the video data and the sound data, but the interleaving is made every six tracks, that is, the editing unit is 6 tracks. FIG. 10 shows such an interleaving operation. In this case, capacities of memory circuits 1 to 3 can be made small.

What is claimed is:

1. A helical scan data recording apparatus comprising:

receiving means for receiving data;

storing means for storing said data and check code data;

error check code generation means for reading said data in data blocks, each block including a predetermined amount of said data from said storing means, said data blocks including video data blocks and corresponding sound data blocks having a common block size corresponding to said predetermined amount of data, whereby said check code generation means generates said check code data using the same check code system between said video data blocks and said corresponding sound data blocks, generating check code data in accordance with said data, and storing said check code data in said storing means for each of said data blocks corresponding to said data interleaving means for interleaving a predetermined number of said data blocks with each other using said storing means, said predetermined number of said data blocks providing a portion of an editing unit; and recording means for recording the interleaved data blocks and said check code data corresponding to the interleaved data blocks on a magnetic tape through helical scanning of every said editing unit, wherein said interleaved data blocks in said editing unit are recorded on consecutive t tracks on said magnetic tape, said interleaved data blocks include said video data blocks and said corresponding sound data blocks, said video data blocks are recorded on said magnetic tape on consecutive (t–p) tracks and said corresponding sound data blocks are recorded on said magnetic tape on consecutive p tracks, t and p being natural numbers, p<t.

2. A helical scan data recording apparatus comprising:

receiving means for receiving data;

storing means for storing said data and check code data;

error check code generation means for reading said data in data blocks, each block including a predetermined amount of said data from said storing means, said data blocks including video data blocks and corresponding sound data blocks having a common block size corresponding to said predetermined amount of data, whereby said check code generation means generates said check code data using the same check code system between said video data blocks and said corresponding sound data blocks, generating check code data in accordance with said data, and storing said check code data in said storing means for each of said data blocks corresponding to said data interleaving means for interleaving a predetermined number of said data blocks with each other using said storing means in accordance with interleaving type data, said predetermined number of said data blocks providing a portion of an editing unit; and recording means for recording the interleaved data blocks and said check code data corresponding to the interleaved data blocks on a magnetic tape through helical scanning of every said editing unit, wherein said interleaved data blocks in said editing unit are recorded on consecutive t tracks on said magnetic tape, said interleaved data blocks include said video data blocks and said corresponding sound data blocks, said video data blocks are recorded on said magnetic tape on consecutive (t–p) tracks and said corresponding sound data blocks are recorded on said magnetic tape on consecutive p tracks, t and p being natural numbers, p<t, and said recording means further records said interleaving type data on said magnetic tape as a sub-code data on said t tracks.

3. A helical scan data recording apparatus, comprising:

receiving means for receiving data;

storing means for storing said data and check code data;

error check code generation means for reading said data in data blocks, each block including a predetermined amount of said data from said storing means, said data blocks including video data blocks and corresponding sound data blocks having a Common block size corresponding to said predetermined amount of data, whereby said check code generation means generates said check code data using the same check code system between said video data blocks and said corresponding sound data blocks, generating check code data in accordance with said data, and storing said check code data in said storing means for each of said data block corresponding to said data;

interleaving means for interleaving a predetermined number of said data blocks with each other using said storing means, said predetermined number of said data blocks providing a portion of an editing unit; and recording means for recording the interleaved data blocks and said check code data corresponding to the interleaved data blocks on a magnetic tape through helical scanning of every said editing unit, wherein said interleaved data blocks in said editing unit are recorded on consecutive t tracks on said magnetic tape, said interleaved data blocks include said video data blocks and said corresponding sound data blocks, said video data blocks are recorded on said magnetic tape on consecutive (t–p) tracks and said corresponding sound data blocks are recorded on said magnetic tape on consecutive p tracks, t and p being natural numbers, p<t, said video data blocks are recorded on consecutive (t–p) tracks to have V sectors on each of said (t–p) tracks, said sound data blocks are recorded on consecutive p tracks to have U sectors on each of said p tracks, each of said V and U sectors corresponds to its respective video or sound data block, said interleaving means interleaves said data blocks with each other with a unit of k sectors, and said V and U are natural numbers, and k is a common divisor of said U and V.

4. A helical scan data recording apparatus comprising:

receiving means for receiving data;

storing means for storing said data and check code data;

error check code generation means for reading said data in data blocks, each block including a predetermined amount of said data from said storing means, generating check code data in accordance with said data, and storing said check code data in said storing means for each of said data blocks corresponding to said data;

interleaving type data generation means for generating interleaving type data which indicates one of the predetermined interleaving type patterns;

interleaving means for interleaving a predetermined number of said data blocks with each other using said storing means in accordance with said interleaving type data, said predetermined number of said data blocks providing a portion of an editing unit; and recording means for recording the interleaved data through helical scanning with a predetermined number of tracks formed for every said editing unit and recording said interleaving type data on said magnetic tape as sub-code data on every said track.

5. A helical scan data recording apparatus as claimed in claim 4, wherein said interleaving means interleaves said data blocks within said editing unit over a plurality of said tracks.

6. A helical scan data recording apparatus as claimed in claim 4, wherein said interleaved data blocks of said editing unit are recorded on consecutive t tracks on said magnetic tape, said interleaved data blocks include video data blocks and corresponding sound data blocks, said video data blocks are recorded on said magnetic tape on consecutive (t–p) tracks and said corresponding sound data blocks are recorded on said magnetic tape on consecutive p tracks, t and p being natural numbers, p<t, and said video data blocks and corresponding sound data blocks have a common block size corresponding to said predetermined amount of data, whereby said check code generation means generates said check code data using the game check code system between said video data blocks and said corresponding sound data blocks.

7. A helical scan data recording apparatus as claimed in claim 4, wherein said interleaved data blocks of said editing unit are recorded on consecutive t tracks on said magnetic tape.

8. A helical scan data recording apparatus comprising:

receiving means for receiving data;

storing means for storing said data and check code data;

error check code generation means for reading said data in data blocks comprising video data blocks and corresponding sound data blocks, each block including a predetermined amount of said data from said storing means, generating check code data in accordance with said data, said check code generation means generates said check code data using the same check code system between said video data blocks and said corresponding sound data blocks, and storing said check code data in said storing means for each of said data blocks corresponding to said data;

interleaving selection means for selecting one from a plurality of predetermined interleaving patterns in accordance with an editing unit and generating interleaving type data in accordance with the selected interleaving pattern;

interleaving means for interleaving a predetermined number of said data blocks with each other in accordance with the selected interleaving pattern using said storing means forming interleaved data blocks including said video data blocks and corresponding sound data blocks, having a common block size corresponding to said predetermined amount of data, said predetermined number of said data blocks providing a portion of said editing unit; and recording means for recording the interleaved data blocks and said check code data corresponding to the interleaved data blocks on consecutive t tracks on a magnetic tape through helical scanning with a predetermined number of tracks formed for every said editing unit, said video data blocks are recorded on said magnetic tape on consecutive (t–p) tracks and said corresponding sound data blocks are recorded on said magnetic tape on consecutive p tracks, t and p being natural numbers, p<t, and recording said interleaving type data on said magnetic tape as sub-code data on every said track.

9. A helical scan data recording apparatus comprising:

receiving means for receiving data;

storing means for storing said data and check code data;

interleaving means for interleaving said data such that every predetermined number of first data blocks are interleaved, said first data blocks including said data from said storing means;

error check code data generation means for generating check code data in accordance with each of said first data blocks, storing said check code data in said storing means to provide second data blocks, each including said first data block and said check code data generated in accordance with each said first data block, said predetermined number of second data blocks providing a portion of an editing unit; and recording means for recording said second data blocks on a magnetic tape through helical scanning, wherein said second data blocks in said editing unit are recorded on consecutive t tracks on said magnetic tape, said second data blocks include video data blocks and corresponding sound data blocks, said video data blocks are recorded on said magnetic tape on consecutive (t–p) tracks and said corresponding sound data blocks are recorded on said magnetic tape on consecutive p tracks, t and p being natural numbers, p<t, and said video data blocks and corresponding sound data blocks have a common block size whereby said check code generation means generates said check code data using the same check code system between said video data blocks and said corresponding sound data blocks.

10. A helical scan data recording apparatus comprising:

receiving means for receiving data;

storing means for storing said data and check code data;

error check code generation means for reading said data in data blocks, each block including a predetermined amount of said data from said storing means, generating check code data in accordance with said data, and storing said check code data in said storing means for each of said data blocks corresponding to said data;

interleaving type data generation means for generating interleaving type data which indicates one of the predetermined interleaving type patterns;

interleaving means for interleaving a predetermined number of said data blocks with each other using said storing means in accordance with said interleaving type data, said predetermined number of said data blocks providing a portion of a unit; and recording means for recording the interleaved data blocks and said check code data corresponding to the interleaved data blocks on a main data area of a magnetic tape through helical scanning with a predetermined number of tracks formed for every said unit, and recording said interleaving type data on a sub-code area which is different area from said main data area of said magnetic tape as sub-code data on every said track.

11. A helical scan data recording apparatus as claimed in claim 10, wherein said interleaving means Interleaves said data blocks within an editing unit over a plurality of said tracks.

12. A helical scan data recording apparatus as claimed in claim 10, wherein said Interleaved data blocks of said unit are recorded at main data areas of consecutive t tracks on said magnetic tape.

13. A helical scan data reproducing apparatus for reproducing data including error correction data on a main data area of a magnetic tape and interleaving type data on a sub-code area which is a different area from said main data area of said magnetic tape as sub-code data, said interleaving type data Indicative of Interleaving effected for said data, comprising:

data reproducing means for reproducing said data from said main data area and interleaving data from said sub-code area; storing means for storing said data from said reproducing means;

selection means for selecting one from a plurality of predetermined de-interleaving formats in accordance with said Interleaving type data reproduced from said sub-code area of said magnetic tape from said data reproducing means;

de-Interleaving means for de-interleaving said data in accordance with said one of a plurality of de-interleaving formats selected by reproduced Interleaving type data using said storing means;

error correction means for error-correcting said de-interleaved data using said error correction data; and outputting means for outputting said error-corrected data.

14. Recording medium for recording digital signals, comprising:

a main data area on which is recorded interleaved data including main data and error correction data, said interleaved data composed of a predetermined amount of data blocks providing a portion of a unit and interleaved by selected one of a plurality interleaving formats in a recording apparatus; and a sub-code area on which is recorded interleaving type data as a sub-code data on every track, said sub-code area being different area from said main data area of said recording medium, said interleaving type data indicating an interleaving type pattern of said interleaved data on said main data area, and for de-interleaving said interleaved data in accordance with one of a plurality of de-interleaving formats by reproduced interleaving type data.

15. A helical scan data recording apparatus as claimed in claim 4, wherein said interleaving type data indicates one of a predetermined interleaving patterns.

16. A helical scan data recording apparatus as claimed in claim 10, wherein said interleaving type data Indicates one of a predetermined interleaving patterns.

17. A digital data reproducing apparatus for reproducing interleaved data blocks on a main data area of a recording medium, and for reproducing interleaving type data on a sub-code area which is different area from said main data area of said recording medium as sub-code data, said interleaving type data indicative of interleaving pattern for said interleaved data comprising data reproducing means for reproducing said interleaved data from said main data area and for reproducing said interleaving type data from said sub-code area; storing means for storing said data from said reproducing means;

selection means for selecting one from a plurality of predetermined de-interleaving formats in accordance with said interleaving type data reproduced from said sub-code area of said recording medium from said data reproducing means;

de-interleaving means for de-interleaving said interleaved data in accordance with said one of a plurality of de-interleaving formats selected by said reproduced interleaving type data;

error correction means for error-correcting said de-interleaved data using an error correction data; and outputting means for outputting said error-corrected data.

18. A helical scan data recording apparatus as claimed in claim 4, wherein a data pattern of said interleaved data blocks is determined in accordance with said interleaving type data.

19. A helical scan data recording apparatus as claimed in claim 18, wherein the interleaved data is recorded at a main data area on every track and said sub-code data is recorded at a sub-code data area on every track.

20. A digital data recording apparatus comprising:

receiving means for receiving digital data;

storing means for storing said data and check code data;

error check code generation means for reading said data in data blocks, each block including a predetermined amount of said data from said storing means, generating check code data in accordance with said data, and storing said check code data in said storing means for each of said data blocks corresponding to said data;

interleaving type data generation means for generating interleaving type data which indicates one of the predetermined interleaving type patterns;

interleaving means for interleaving a predetermined number of said data blocks with each other in accordance with interleaving type data, said predetermined number of said data blocks providing a portion of a unit; and recording means for recording the interleaved data blocks on a main data area of recording medium with a predetermined number of tracks formed for every said unit and recording said interleaving type data on a sub-code area which is different from said main data area of said recording medium as sub-code data on every said track.

* * * * *